July 1, 1930.  B. R. BENJAMIN  1,769,104
COTTON STRIPPER
Filed April 8, 1929  2 Sheets-Sheet 2
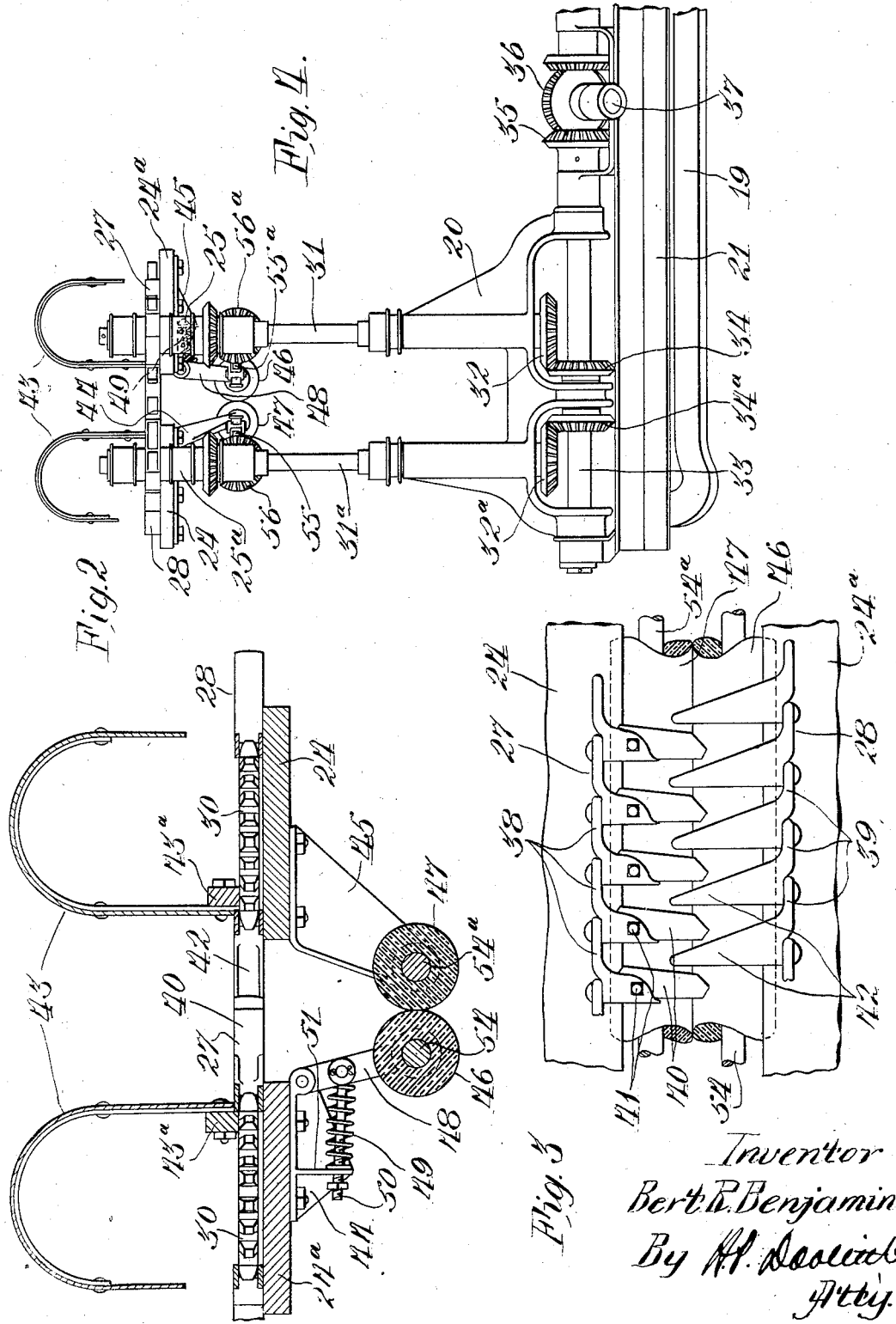
Inventor
Bert R. Benjamin
By H. P. Doolittle
Atty.

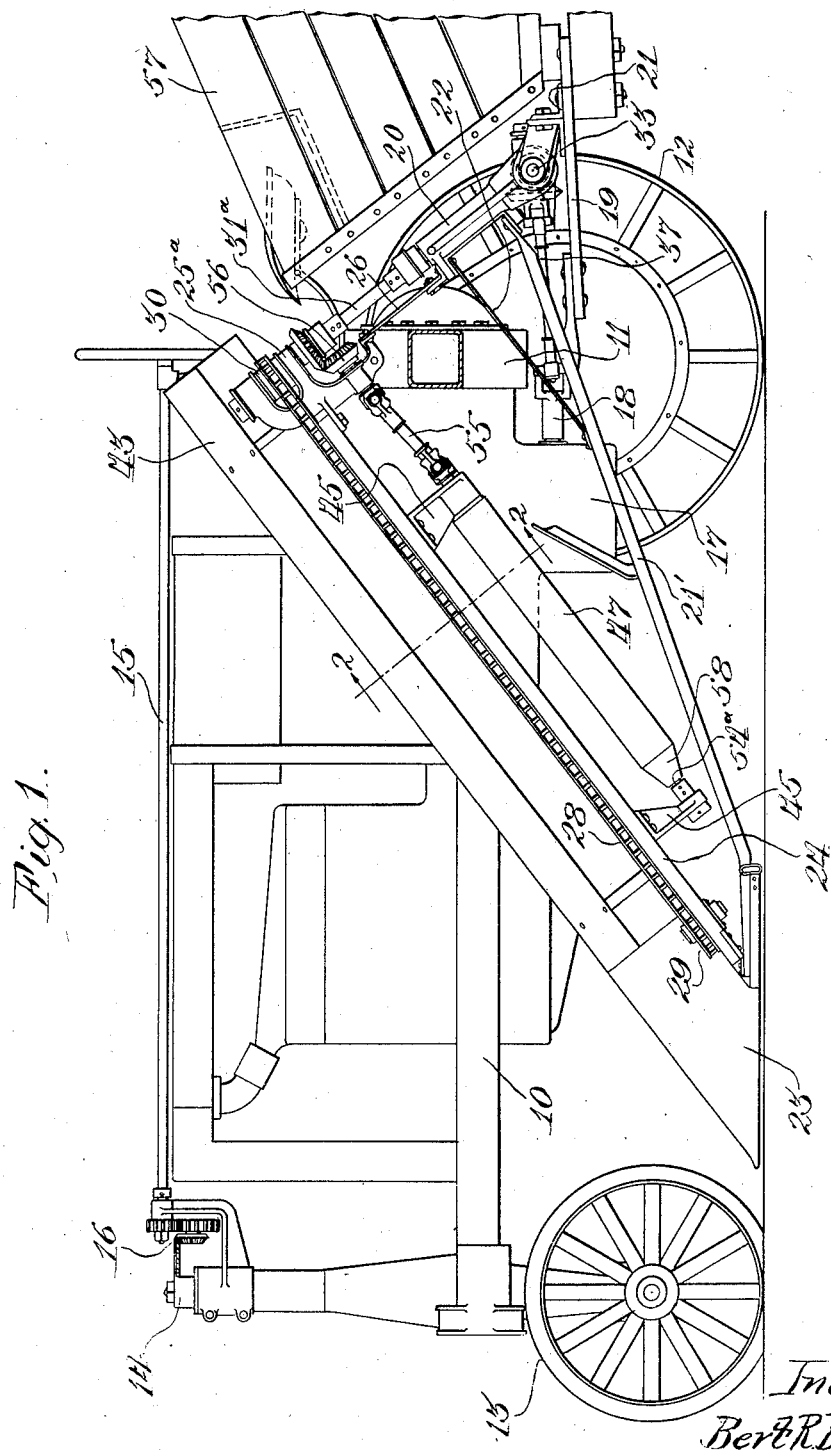

Patented July 1, 1930

1,769,104

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

COTTON STRIPPER

Application filed April 8, 1929. Serial No. 353,424.

The present invention relates to harvesters of the stripper class and is directed to improvements in the mechanism for removing and collecting a crop such as cotton bolls as the machine moves along the plant row.

In stripping cotton bolls from the standing plants, it has heretofore been impossible to prevent the stripping means from breaking off and collecting quantities of twigs and branches which become mixed with the bolls with obvious disadvantages. The chief objects of this invention are to eliminate this objectionable collection of trash and to increase the efficiency of the stripping mechanism. This has been accomplished by providing means for grasping and holding the branches of the plants as the stripping mechanism acts on them and acting in conjunction with the stripping mechanism to practically prevent material other than the bolls from being stripped from the plants while increasing the efficiency of the stripping action in the collection of bolls, the structure to be disclosed involving improvements over that in applicant's prior application Serial No. 295,642 filed July 27, 1928.

The invention accordingly resides in the combination of parts and details of construction hereinafter described and claimed and illustrated in the accompanying drawings. In these drawings:

Figure 1 is a side elevation of a stripping device embodying the invention as applied to a tractor;

Figure 2 is a transverse section on an enlarged scale, taken on line 2—2 of Figure 1;

Figure 3 is a fragmentary detail view in plan showing a part of the stripping mechanism; and, Figure 4 is a rear elevation of the drive mechanism from the tractor power take-off to one of the stripping mechanisms.

In its broadest aspect, the present invention contemplates the combination with means for stripping the fruit from plants standing in a row by progressive action along the length of the plant stalk from butt to tip, as practiced on cotton plants in the boll stage; of means for grasping the plant adjacent the point of action of the stripping means and in following up relation thereto, whereby the grasping means acts to hold the twigs and branches and preferably to pull them through the stripping means.

In the present instance the invention has been illustrated as embodied in a structure designed for attachment at one or both sides of a tractor of the wide tread row crop type. The tractor referred to comprises a narrow longitudinally extending body portion 10 connected at its rear end to a transverse axle structure 11 supported on traction wheels 12. The axle structure spans two plant rows and the forward end of the tractor body is supported on a central steering truck 13 which travels in the space between the two rows spanned by the rear wheels. The steering truck includes a vertical standard 14 which is swiveled on the tractor frame and to which a steering wheel and rod 15 is connected by suitable gearing 16. The body 10 of the tractor supports the engine, transmission, and clutch housings in the usual manner. The transmission housing, however, is provided with a depending housing 17 which contains gearing driven from the transmission and serves to actuate a rearwardly projecting power take-off shaft 18, which is located on the central longitudinal median line of the tractor.

In the application of a device of the present invention to the tractor above described, there is provided a rearwardly extending supporting frame 19, which is secured in any suitable manner to the axle structure of the tractor. This frame has mounted thereon at either side of the power shaft 18 an upstanding bearing frame 20, which is preferably a casting, and is connected to the supporting frame 19 through a transverse base member 21 on which is journaled a shaft 33, as shown in Figure 4. As these frames are substantially duplicates, only one is illustrated. The bearing frame 20 is carried at a forward inclination, as seen in Figure 1. It will be understood that a stripping unit will be carried at each side of the tractor body 10, but, as the structures are the same, only one of the stripping organizations together with its driving connections, etc. will be described. The bearing frame 20 is connected to forwardly and downwardly extending frame bars 21', which may be braced thereto by bars 22. At their forward ends the bars 21' are on the ground line and are there secured to the runner points 23 which are spaced apart to dispose one on each side of the row in the usual manner. Each runner point 23 is secured to a rearwardly and upwardly inclined conveyer plate or board 24, 24ª. The rear ends of plates 24—24ª are secured to bearing castings 25—25ª, which in turn are supported on the bearing frame 20 by upright bars 26 (Figure 1). It will be understood that the conveyer plates 24—24ª are arranged in parallel spaced relation in the same plane, as seen in Figure 2. The tractor-stripper combination described forms the subject-matter of a co-pending application Serial No. 388,111 filed August 24, 1929.

Each conveyor plate supports a stripper belt or chain 27 and 28, each of the belts passing over an idler sprocket 29 on the lower end of a gathering plate and over a drive sprocket 30 mounted on a drive shaft 31—31ª, the upper ends of which are journaled in the bearing brackets 25—25ª. The pair of drive shafts 31—31ª (Figure 4) are journaled at their lower ends in the supporting frame 20 and are connected by beveled pinions 32—32ª to the horizontal drive shaft 33 through meshing beveled pinions 34—34ª fixed on these shafts. The drive shaft 33 is provided at its inner end with a drive pinion 35 in mesh with a similar pinion 36 secured to a shaft 37, which forms an extension of the power take-off shaft 18. The direction of rotation of the driving connections is such that the picker belts 27 and 28 will be actuated to move the inner runs thereof from the ground upwardly. Each of the picker belts is composed of pivotally connected sections, as shown at 38 and 39 (Figure 3). In the case of the belt 27, the sections 38 are formed to provide sockets in which are seated the bases of flexible fingers 40 which extend laterally into the space between the conveyer plates. A bolt 41 secures each finger in its socket. The fingers 40 are preferably made of rubber. The opposite belt 28 carries rigid metallic fingers 42 which may form an integral part of the link 39. These fingers 42 are arranged in staggered relation to the fingers 40, and the respective fingers on the belts 27 and 28 overlap and are spaced from one another in the manner illustrated in Figure 3. Inwardly of the projecting fingers on the belts, the conveyer plates and belts are preferably covered and protected from contact with the plants by means of overhanging shields 43 which are secured to lugs 43ª on the gathering plates. The under side of each conveyer plate is provided with longitudinally spaced depending brackets 44 and 45 (Figure 2) in which there are journaled the opposite ends of elongated grasping rollers 46 and 47. These rollers are normally in contact at their inner sides and are preferably composed or surfaced with yielding material such as rubber. Each roller includes a central shaft 54 and 54ª, and these are connected at the rear ends through flexible shafts 55 and 55ª to drive pinions 56 and 56ª fixed to stub shafts journaled in bearing brackets 25. The pinions 56 and 56ª are in mesh with bevel pinions on the shafts 31—31ª and are driven so that the upper surfaces of the rollers are moved inwardly and downwardly so as to pull plants downwardly between them. The roller 47 is held in fixed position on the bearing brackets 45 which are rigid. The roller 46, however, is yieldably mounted and may be journaled in the ends of depending bearing arms 48 which are pivoted at their upper ends to the brackets 44 and are spring pressed inwardly, as by means of coil springs 49 carried on rods 50, which extend from the arm 48 and through an aperture in a web 51 on the bracket 44. As best seen in Figure 2, the grasping rollers are located immediately beneath the stripping elements and with their inner sides contacting in a longitudinal, vertical plane midway of the space between the conveyer plates 24—24ª.

In the operation of the invention as embodied in the structure above described, a forward travel of the tractor will cause the plants in a row straddled by the stripping mechanism to be engaged in the spaces between the stripping fingers 40 and 42. Due to the inclination of the stripping elements, the plants or stalks are engaged first at the base and the engagement progresses upwardly as the machine progresses with the result that the plants are in effect moved downwardly between the stripping fingers resulting in detachment of the cotton bolls or similar fruit being harvested, which is then carried upwardly by the picking fingers acting as conveyors and delivered to a hopper 57 carried on the frame 19. Shortly after engagement of the plants between the stripping fingers, the plants are also engaged between the stripping rollers 46 and 47, the forward ends of which are preferably tapered as at 58 (Figure 1) to facilitate such engagement. As the rollers exert pressure on the plants and are positively driven, the effect of engagement will be to pull the plants downwardly through the stripping fingers and at the same time to grasp the limbs and twigs at a point near enough to that being acted upon by the fingers as to hold and prevent branches and twigs from being broken off and gathered with the bolls. The yieldable mounting of one roller permits the rollers to spread apart according to the size of the plants engaged and a soft or rubber surface composition of the rollers provides the frictional gripping action and lessens the tendency to breaking off of the limbs held. Likewise, the presence of rubber fingers in the stripping element increases the efficiency of the stripping action by increasing friction, and reduces breakage of twigs by reason of the yielding hold provided.

The above structure exemplifies an embodiment of the invention which may be subjected to modifications without departing from the scope of the invention as defined in the following claims.

What is claimed is:

1. In a stripper harvester for row grown crops, the combination of a supporting vehicle, an elongated stripping element supported in inclined position longitudinally of the vehicle and having laterally extending fingers between which the standing plants engage during progress of the vehicle, and a pair of opposed grasping rollers journaled beneath the stripping element and between which the plants pass during engagement by the stripping element.

2. In a stripper harvester for row grown crops, the combination of a supporting vehicle, an elongated stripping element supported in inclined position longitudinally of the vehicle and having laterally extending fingers between which the standing plants engage during progress of the vehicle, a pair of opposed grasping rollers journaled beneath the stripping element, and means on the vehicle for rotating the rollers in opposite directions with the upper surfaces thereof moving inwardly.

3. In a stripper harvester for row grown crops, the combination of a supporting vehicle, parallel spaced gathering plates supported in inclined position longitudinally of the vehicle, an endless stripper belt mounted on each plate, stripping fingers on each belt projecting laterally therefrom into the space between the gathering plates, a pair of elongated rollers mounted beneath the gathering plates in parallel relation thereto, the inner surfaces of said rollers contacting on a longitudinal plane midway of the space between the plates, and means on the vehicle for rotating the rollers in opposite directions with the upper surfaces thereof moving inwardly.

4. In stripper mechanism of the character described, the combination of an elongated stripper belt having laterally projecting fingers, a pair of elongated grasping rollers mounted beneath the fingers with the inner sides of the rollers normally in contact, and yielding means for resisting separation of the rollers.

5. In stripper mechanism of the character described, the combination of an elongated stripper belt having laterally projecting fingers, and a pair of elongated grasping rollers mounted beneath the fingers with the inner sides of the rollers normally in contact, the surfaces of said rollers being composed of yielding material.

6. In stripper mechanism of the character described, the combination with means for stripping the fruit from a standing plant by progressive action from end to end of the plant stalk, of a pair of rubber surfaced grasping rollers positioned adjacent the stripping means and cooperating therewith to grasp a plant during engagement thereof by the stripping means.

7. In stripper mechanism of the character described, the combination with means for stripping the fruit from a standing plant by progressive action from end to end of the plant stalk, of a pair of yieldable grasping elements, normally in contact and positioned adjacent the stripping means to grasp a plant in cooperating relation to said stripping means.

In testimony whereof I affix my signature.

BERT R. BENJAMIN.